UNITED STATES PATENT OFFICE.

FRIEDRICH RUNKEL AND MARTIN HERZBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

950,405.  Specification of Letters Patent.  Patented Feb. 22, 1910.

No Drawing.   Application filed July 22, 1909.  Serial No. 508,984.

*To all whom it may concern:*

Be it known that we, FRIEDRICH RUNKEL and MARTIN HERZBERG, doctors of philosophy, chemists, citizens of the German Empire, residing at Elberfeld, Germany, have invented new and useful Improvements in New Azo Dyes, of which the following is a specification.

In our application of the same date Serial No. 508,985, we have described a class of azo colors obtainable from halogen substituted derivatives of aminophenylethers, periaminonaphthol sulfonic acid and any other diazo compound.

This application relates specifically to the manufacture and production of a new azo dye which can be obtained by combining the diazo compound of 2.5-dichloroanilin and one molecule of the diazo compound of ortho-amino-para-chloro-phenylether with one molecule of 1.8-aminonaphthol-3.6-disulfonic acid.

In order to illustrate the new process more fully the following example is given, the parts being by weight. 16.2 parts of 2.5-dichloroanilin are dissolved in 160 parts of hot water and 160 parts of hot crude hydrochloric acid, ice is added and the dichloroanilin is diazotized with 7.1 parts of sodium nitrite. 50 per cent. of the excess of hydrochloric acid are then neutralized with sodium carbonate and 31.9 parts of freshly precipitated 1.8.3.6-aminonaphthol disulfonic acid are added to the mass of the reaction which has to be stirred for about 10 hours. After it has been rendered alkaline with sodium carbonate the diazo compound of 22 parts of ortho-amino-para-chloro-phenylether:

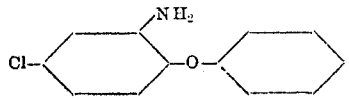

are added. After some time the precipitated dye is filtered off, redissolved from hot water, filtered off, pressed and dried. It is after being dried and pulverized in the shape of its sodium salt a dark powder soluble in water with a dark blue color and soluble in concentrated sulfuric acid with a dark green color.

Upon reduction with stannous chlorid and hydrochloric acid the new dye is decomposed, 2.5-dichloroanilin, ortho-amino-para-chloro-phenylether and 1.2.7-triamino-8-naphthol-3.6-disulfonic acid are obtained. The new dyestuff dyes wool blue-black shades fast to washing and to milling.

We claim:

The herein described new diazo dyestuff obtainable from diazotized dichloroanilin, diazotized ortho-amino-para-chloro-phenylether and 1.8-aminonaphthol-3.6-disulfonic acid, which dye is after being dried and pulverized in the shape of its sodium salt a dark powder soluble in water with a dark blue color and soluble in concentrated sulfonic acid with a dark green color; yielding upon reduction with stannous chlorid and hydrochloric acid dichloroanilin, ortho-amino-para-chloro-phenylether and 1.2.7-triamino 8-naphthol-3.6-disulfonic acid; and dyeing wool blue-black shades remarkable for their fastness to washing and to milling, substantially as described.

In testimony whereof we have hereunto set our hands in the presence of two subscribing witnesses.

FRIEDRICH RUNKEL.  [L. S.]
MARTIN HERZBERG.  [L. S.]

Witnesses:
OTTO KÖNIG,
WILLY KLEIN.

Corrections in Letters Patent No. 950,405.

It is hereby certified that in Letters Patent No. 950,405, granted February 22, 1910, upon the application of Friedrich Runkel and Martin Herzberg, of Elberfeld, Germany, for an improvement in "Azo Dyes," errors appear in the printed specification requiring correction as follows: Line 55, the word "animo" should read *amino*, and lines 68-69 the word "sulfonic" should read *sulfuric;* and that the said Letters Patent should be read with these corrections therein that the same may conform to the record of the case in the Patent Office.

Signed and sealed this 26th day of April, A. D., 1910.

[SEAL.]

C. C. BILLINGS,
*Acting Commissioner of Patents.*